(12) United States Patent
Ha et al.

(10) Patent No.: US 12,534,794 B2
(45) Date of Patent: Jan. 27, 2026

(54) COATING FILM FOR AUTOMOBILE EXTERIOR

(71) Applicants: Hyundai Motor Company, Seoul (KR); Kia Corporation, Seoul (KR); KCC Corporation, Seoul (KR)

(72) Inventors: Jaehwan Ha, Gyeonggi-do (KR); Kyuyeob Park, Gyeonggi-do (KR); Changman Park, Gyeonggi-do (KR); Changhui Lee, Gyeonggi-do (KR)

(73) Assignees: Hyundai Motor Company, Seoul (KR); Kia Corporation, Seoul (KR); KCC Corporation, Seoul (KR)

( * ) Notice: Subject to any disclaimer, the term of this patent is extended or adjusted under 35 U.S.C. 154(b) by 36 days.

(21) Appl. No.: 18/535,744

(22) Filed: Dec. 11, 2023

(65) Prior Publication Data

US 2025/0019818 A1 Jan. 16, 2025

(30) Foreign Application Priority Data

Jul. 12, 2023 (KR) .......................... 10-2023-0090633

(51) Int. Cl.
*C23C 14/24* (2006.01)
*C23C 14/02* (2006.01)
*C23C 14/20* (2006.01)
*C23C 14/58* (2006.01)

(52) U.S. Cl.
CPC ............ *C23C 14/24* (2013.01); *C23C 14/024* (2013.01); *C23C 14/20* (2013.01); *C23C 14/58* (2013.01)

(58) Field of Classification Search
None
See application file for complete search history.

(56) References Cited

U.S. PATENT DOCUMENTS

| 6,328,358 | B1 | 12/2001 | Berweiler |
| 7,619,575 | B2 | 11/2009 | Kamiya et al. |
| 2007/0117380 | A1* | 5/2007 | Ido .................. H01Q 1/3233 438/653 |
| 2016/0215161 | A1* | 7/2016 | Chen ................... C09D 175/14 |
| 2019/0240897 | A1* | 8/2019 | Liu ............................ B32B 7/12 |
| 2022/0089867 | A1* | 3/2022 | Kosaka ............... C08K 5/3465 |

* cited by examiner

*Primary Examiner* — Shamim Ahmed
*Assistant Examiner* — Bradford M Gates
(74) *Attorney, Agent, or Firm* — Fox Rothschild LLP (57) ABSTRACT

Disclosed is a coating film preferably for automobile exterior including a substrate; an undercoat layer disposed on the substrate and including an undercoat composition; a metal layer deposited on the undercoat layer in an island structure and including aluminum (Al) and a low melting point metal; and a topcoat layer disposed on the metal layer and including a topcoat composition, wherein the undercoat composition may include a hexa-functional or higher urethane (meth)acrylate oligomer, a tri-functional urethane (meth)acrylate oligomer, a tetra-functional urethane (meth)acrylate oligomer, and a tri-functional or lower (meth)acrylate monomer, and the topcoat composition may include a hexa-functional or higher urethane (meth)acrylate oligomer, a bi-functional urethane (meth)acrylate oligomer, a penta-functional urethane (meth)acrylate oligomer, and a tri-functional or lower (meth)acrylate monomer.

18 Claims, 2 Drawing Sheets

COATING FILM FOR AUTOMOBILE EXTERIOR

CROSS-REFERENCE TO RELATED APPLICATION

This application claims under 35 U.S.C. § 119(a) the benefit of Korean Patent Application No. 10-2023-0090633 filed in the Korean Intellectual Property Office on Jul. 12, 2023, the entire contents of which are incorporated herein by reference.

BACKGROUND

Technical Field

A coating film preferably for automobile exterior is disclosed.

Background

As autonomous driving technology is advanced, various sensors are being installed in cars. In particular, a radar sensor is a sensor capable of accurately determining a location of a car by using electromagnetic waves, which has an advantage of being easy to use even in bad weather situations and currently, is usefully used as an essential sensor for autonomous driving. Since a radar has been installed in automobiles, its function has expanded from a conventional fragmentary function of recognizing objects just in front to a front/rear and side area detection function and a door-closing system implementation function as time passes, and currently, more radar sensors tend to be installed in vehicles.

Since the radar has the greatest advantage that the sensor itself is not exposed to the outside, there may be a problem of deteriorating radar performance due to external structures. When a surface treatment with a metal component such as plating or deposition, etc. is performed for exterior design, the metal component may interfere with transmission/reception of radio waves, resulting in operational errors of radar sensors.

In order to solve this problem, an advanced surface treatment capable of transmitting and receiving the radio waves need to be conducted by securing an island-shaped microstructure of preventing conductive particles from contacting each other. Typical metals with these characteristics may representatively include tin, indium, tin alloy and the like and is required to have a thickness limitation of about 100 nm or less to secure the island-shaped microstructure. However, these metals such as tin, tin alloy, indium, and the like are accompanied by various reliability problems such as adhesion, oxidation, discoloration, peeling, and the like in a part unit due to a thin thickness and low properties of the materials themselves and particularly, when exposed to very harsh automobile exterior environments, may be very rarely applied.

SUMMARY

An embodiment provides a coating film preferably for automobile exterior (available for other applications) that has improved electromagnetic wave transmission performance, has a surface treatment effect for a high-quality feel of parts, and has excellent adhesion, chemical resistance, water resistance, and accelerated weather resistance, so that it can be used even in very harsh automobile exterior environments.

According to an embodiment, a coating film for automobile exterior includes a substrate; an undercoat layer disposed on the substrate and including an undercoat composition; a metal layer deposited in an island structure on the undercoat layer and including aluminum (Al) and a low melting point metal; and a topcoat layer disposed on the metal layer and including a topcoat composition.

The low melting point material may include tin, indium, tin alloy, or a combination thereof.

The undercoat composition may include a hexa-functional or higher urethane (meth)acrylate oligomer, a tri-functional urethane (meth)acrylate oligomer, a tetra-functional urethane (meth)acrylate oligomer, and a tri-functional or lower (meth)acrylate monomer, and the topcoat composition may include a hexa-functional or higher urethane (meth)acrylate oligomer, a bi-functional urethane (meth)acrylate oligomer, a penta-functional urethane (meth)acrylate oligomer, and a tri-functional or lower (meth)acrylate monomer.

In the undercoat composition, the tri-functional urethane (meth)acrylate oligomer may be included in a higher content than each of the hexa-functional or higher urethane (meth)acrylate oligomer and the tetra-functional urethane (meth)acrylate oligomer.

The undercoat composition may include about 1 wt % to about 8 wt % of the hexa-functional or higher urethane (meth)acrylate oligomer, about 10 wt % to about 20 wt % of the tri-functional urethane (meth)acrylate oligomer, about 5 wt % to about 15 wt % of the tetra-functional urethane (meth)acrylate oligomer, and about 15 wt % to about 25 wt % of the tri-functional or lower (meth)acrylate monomer based on a total amount of the undercoat composition.

The hexa-functional or higher urethane (meth)acrylate oligomer in the undercoat composition may have a weight average molecular weight of about 500 g/mol to about 3,000 g/mol, and a viscosity (60° C.) of about 1,000 cP to about 4,000 cP.

The tri-functional urethane (meth)acrylate oligomer in the undercoat composition may have a weight average molecular weight of about 1,500 g/mol to about 3,000 g/mol and a viscosity (60° C.) of about 10,000 cP to about 30,000 cP.

The tetra-functional urethane (meth)acrylate oligomer in the undercoat composition may have a weight average molecular weight of about 500 g/mol to about 2,000 g/mol and a viscosity (60° C.) of about 1,000 cP to about 3,500 cP.

The tri-functional or lower (meth)acrylate monomer in the undercoat composition may include about 5 wt % to about 15 wt % of a bi-functional (meth)acrylate monomer and about 5 wt % to about 15 wt % of tri-functional (meth)acrylate monomer based on a total amount of the undercoat composition.

A thickness of the undercoat layer may be about 10 μm to about 25 μm.

A thickness of the metal layer may be about 0.02 μm to about 0.1 μm.

The topcoat composition may include about 1 wt % to about 8 wt % of the hexa-functional or higher urethane (meth)acrylate oligomer, about 5 wt % to about 15 wt % of the bi-functional urethane (meth)acrylate oligomer, about 5 wt % to about 15 wt % of the penta-functional urethane (meth)acrylate oligomer, and about 18 wt % to about 28 wt % of the tri-functional or lower (meth)acrylate monomer based on a total amount of the topcoat composition.

The hexa-functional or higher urethane (meth)acrylate oligomer in the topcoat composition may have a weight average molecular weight of about 500 g/mol to about 5,000 g/mol and a viscosity (60° C.) of about 1,000 cP to about 5,000 cP.

The bi-functional urethane (meth)acrylate oligomer in the topcoat composition may have a weight average molecular weight of about 5,000 g/mol to about 20,000 g/mol and a viscosity (60° C.) of about 10,000 cP to about 20,000 cP.

The penta-functional urethane (meth)acrylate oligomer in the topcoat composition may have a weight average molecular weight of about 5,000 g/mol to about 10,000 g/mol, and a viscosity (60° C.) of about 500 cP to about 3,000 cP.

The tri-functional or lower (meth)acrylate monomer in the topcoat composition may include about 1 wt % to about 5 wt % of a mono-functional urethane (meth)acrylate monomer and about 15 wt % to about 25 wt % of a tri-functional (meth)acrylate monomer based on a total amount of the topcoat composition.

A thickness of the topcoat layer may be about 10 μm to about 25 μm.

The undercoat composition and topcoat composition may be ultraviolet curable paint compositions.

The metal layer may be formed by vacuum deposition (PVD).

In another embodiment, a vehicle including the aforementioned coating film is described.

According to an embodiment, provided is an embodiment provides a coating film for automobile exterior that has improved electromagnetic wave transmission performance, has a surface treatment effect for a high-quality feel of parts, and has excellent adhesion, chemical resistance, water resistance, and accelerated weather resistance, so that it can be used even in very harsh automobile exterior environments.

DETAILED DESCRIPTION OF THE EMBODIMENTS

The advantages, features, and aspects to be described hereinafter will become apparent from the following description of the embodiments with reference to the accompanying drawings, which is set forth hereinafter. However, the embodiments should not be construed as being limited to the embodiments set forth herein. Although not specifically defined, all of the terms including the technical and scientific terms used herein have meanings understood by ordinary persons skilled in the art. The terms defined in a generally-used dictionary may not be interpreted ideally or exaggeratedly unless clearly defined.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

In the drawings, the thickness of layers, films, panels, regions, etc., are exaggerated for clarity. Like reference numerals designate like elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

Figure 1:
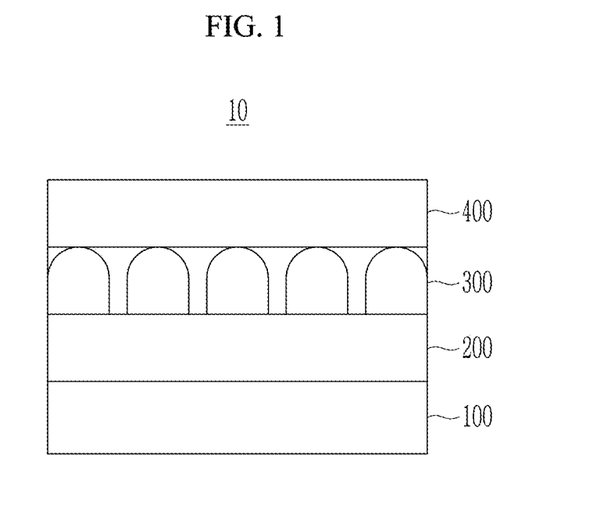
FIG. 1 is a view briefly illustrating a cross section of a coating film for automobile exterior according to an embodiment.

FIG. 1 is a view briefly illustrating a cross section of a coating film for automobile exterior according to an embodiment.

Referring to FIG. 1, the coating film 10 for automobile exterior according to an embodiment includes a substrate 100, an undercoat layer 200 disposed on the substrate 100, a metal layer 300 disposed on the undercoat layer 200, and a topcoat layer 400 disposed on the metal layer 300.

[Substrate]

The substrate 100 is a plastic substrate and may include various polymer resins such as ABS, PC, etc., but is not limited thereto.

[Metal Layer]

The metal layer 300 includes aluminum (Al) and a low melting point metal, and is formed by depositing it in an island structure.

By simultaneously depositing aluminum (Al) and a low melting point metal, the surface mobility of Al can be increased to form a fine island structure of less than or equal to about 100 nm, and electromagnetic wave transmission performance can be improved by the metal layer formed in this way. In addition, a hardness increases due to the metal layer formed using aluminum (Al) and a low melting point metal, making it suitable for automotive exterior environments that require higher durability of parts, and can have a surface treatment effect for a high-quality feel of parts.

The low melting point metal may include tin, indium, or a combination thereof, but is not limited thereto.

For example, the metal layer 300 may include about 70 at % to about 85 at % of the aluminum (Al) and about 15 at % to about 30 at % of the low melting point metal. When the metal layer has a composition ratio within the above range, it is easy to form an island-structured deposition layer and can have excellent electromagnetic wave transmission performance.

The metal layer 300 may be formed of aluminum (Al) or a low melting point metal by vacuum deposition (PVD).

A thickness of the metal layer 300 may be about 0.02 μm to about 0.1 μm. If the thickness of the metal layer is within the above range, the coating film for automobile exteriors may have improved electromagnetic wave transmission performance, a surface treatment effect for a high-quality feel of the part, and a with excellent adhesion, and all improved chemical resistance, water resistance, and accelerated weather resistance.

In order to protect the metal layer 300, an undercoat layer 200 including an undercoat composition may be disposed under the metal layer 300, and a topcoat layer 400 including a topcoat composition may be disposed on the metal layer 300.

The island-structured metal layer 300 may wrinkle because it is difficult to suppress thermal expansion of the undercoat layer. However, according to an embodiment, the undercoat layer 200 formed of an undercoat composition and the topcoat layer 400 formed of a topcoat composition protect the metal layer 300 from the bottom and top, thermal expansion may be suppressed, preventing wrinkles from occurring, and UV penetration is difficult to achieve, resulting in excellent accelerated weather resistance.

[Undercoat Layer]

The undercoat layer 200 may be a primer layer and may be formed of an undercoat composition. Hereinafter, the undercoat composition will be described.

The undercoat composition may be an ultraviolet curable paint composition, which includes a hexa-functional or higher urethane a (meth)acrylate oligomer, a tri-functional urethane (meth)acrylate oligomer, a tetra-functional urethane (meth)acrylate oligomer, and a tri-functional or lower (meth)acrylate monomer.

By using three types of oligomers with different functional groups, the curing reaction rate and drying rate of the undercoat composition can be adjusted to improve adhesion to the metal layer having an island structure, and a crosslink density of the coating film can be adjusted to improve water resistance, mechanical properties such as corrosion resistance.

The undercoat composition may not only improve adhesion between the plastic substrate 100 and the metal layer 300 and has excellent chemical and water resistance, but may also suppress thermal expansion as much as possible to prevent wrinkles in the coating film even when ultraviolet rays penetrate, thereby promoting weather resistance.

Hexa-Functional or Higher Urethane (Meth)Acrylate Oligomer

The hexa-functional or higher urethane (meth)acrylate oligomer may be a urethane (meth)acrylate oligomer having 6 or more polymerizable functional groups, for example 6 to 10, for example 6 to 8, for example 6 or 7, which are polymerizable unsaturated groups. The hexa-functional or higher urethane (meth)acrylate oligomer may play a role in improving the chemical resistance and accelerated weather resistance of the undercoat composition.

A weight average molecular weight (Mw) of the hexa-functional or higher urethane (meth)acrylate oligomer may be about 500 g/mol to about 3,000 g/mol, for example, about 800 to about 2,500 g/mol. A viscosity (60° C.) of the hexa-functional or higher urethane (meth)acrylate oligomer may be about 1,000 cP to about 4,000 cP, for example, about 1,500 cP to about 3,500 cP. When the hexa-functional or higher urethane (meth)acrylate oligomer has a weight average molecular weight and viscosity (60° C.) in the above range, the hardness, adhesion, and gloss of the coating film are improved, and an appearance of the coating film is improved due to improved workability.

The hexa-functional or higher urethane (meth)acrylate oligomers may be used alone or in a mixture of two or more types.

The hexa-functional or higher urethane (meth)acrylate oligomer may be included in an amount of about 1 wt % to about 8 wt %, for example, about 2 wt % to about 6 wt %, based on a total amount of the undercoat composition. When the hexa-functional or higher urethane (meth)acrylate oligomer is included in the above range, curability, chemical resistance, weather resistance, and adhesion of the coating film as well as elasticity, appearance, and scratch resistance of the coating film are improved by maintaining an appropriate crosslinking density.

Tri-Functional Urethane (Meth)Acrylate Oligomer

The tri-functional urethane (meth)acrylate oligomer may be a urethane (meth)acrylate oligomer that has three polymerizable functional groups, which are unsaturated groups, and serves to improve durability, adhesion, and flexibility of the coating film.

A weight average molecular weight (Mw) of the tri-functional urethane (meth)acrylate oligomer may be about 1,500 g/mol to about 3,000 g/mol, for example, about 1,800 g/mol to about 2,500 g/mol. A viscosity (60° C.) of the tri-functional urethane (meth)acrylate oligomer may be about 10,000 cP to about 30,000 cP, for example, about 13,000 cP to about 27,000 cP. When the tri-functional urethane (meth)acrylate oligomer has a weight average molecular weight and viscosity (60° C.) in the above ranges, the adhesion and gloss of the coating film are excellent, and the workability is improved, so that the appearance and weather resistance of the coating film can be improved.

The tri-functional urethane (meth)acrylate oligomer may be used as a main resin in the undercoat composition, and can be used in higher amounts than each of the hexa-functional or higher urethane (meth)acrylate oligomer and tetra-functional urethane (meth)acrylate oligomer.

Specifically, the tri-functional urethane (meth)acrylate oligomer may be included in an amount of about 10 wt % to about 20 wt %, for example, about 12 wt % to about 18 wt %, based on the total amount of the undercoat composition. When the tri-functional urethane (meth)acrylate oligomer is included in the above range, the chemical resistance, weather resistance, and adhesion of the coating film are excellent by maintaining an appropriate crosslinking density, and the appearance of the coating film can be improved due to excellent workability.

Tetra-Functional Urethane (Meth)Acrylate Oligomer

The tetra-functional urethane (meth)acrylate oligomer may be a urethane (meth)acrylate oligomer that has four polymerizable functional groups, which are unsaturated groups, and serves to improve the durability, adhesion, and flexibility of the coating film.

A weight average molecular weight (Mw) of the tetra-functional urethane (meth)acrylate oligomer may be about 500 g/mol to about 2,000 g/mol, for example, about 800 g/mol to about 1,700 g/mol. A viscosity (60° C.) of the tetra-functional urethane (meth)acrylate oligomer may be about 1,000 cP to about 3,500 cP, for example, about 1,500 cP to about 3,000 cP. When the tetra-functional urethane (meth)acrylate oligomer has a weight average molecular weight and viscosity (60° C.) in the above range, the adhesion and gloss of the coating film are excellent, and the workability is improved, so that the appearance and water resistance of the coating film can be improved.

The tetra-functional urethane (meth)acrylate oligomer may be included in an amount of about 5 wt % to about 15 wt %, for example about 7 wt % to about 13 wt %, based on the total amount of the undercoat composition. When tetra-functional urethane (meth)acrylate oligomer is included in the above range, the chemical resistance, weather resistance and adhesion of the coating film are excellent by maintaining an appropriate crosslinking density, and the appearance and heat resistance of the coating film are improved due to excellent workability.

Tri-Functional or Lower (Meth)Acrylate Monomer

The tri-functional or lower (meth)acrylate monomer may be a (meth)acrylate monomer having 3 or less, for example, 1 to 3, for example, 2 or 3, polymerizable functional groups that are polymerizable unsaturated groups. The tri-functional or lower (meth)acrylate monomer serves to improve the viscosity, hardness, and adhesion of the undercoat composition.

Examples of the tri-functional or lower (meth)acrylate monomer may include trimethylolpropane tri(meth)acrylate, ethoxylated trimethylolpropane tri(meth)acrylate, propoxylated trimethylolpropane tri(meth)acrylate, pentaerythritol tri(meth)acrylate, 1,6-hexanediol di(meth)acrylate, isobornyl (meth)acrylate, and these may be used alone or in a mixture of two or more types.

The tri-functional or lower (meth)acrylate monomer may include a bi-functional (meth)acrylate monomer and a tri-functional (meth)acrylate monomer.

The tri-functional or lower (meth)acrylate monomer may be included in an amount of about 15 wt % to about 25 wt % based on a total amount of the undercoat composition. In addition, when the tri-functional or lower (meth)acrylate monomer includes the bi-functional (meth)acrylate monomer and the tri-functional (meth)acrylate monomer, the bi-functional (meth)acrylate monomer may be included in an amount of about 5 wt % to about 15 wt % based on a total amount of the undercoat composition and the tri-functional (meth)acrylate monomer may be included in an amount of about 5 wt % to about 15 wt % based on a total amount of the undercoat composition. When the tri-functional or lower (meth)acrylate monomer is included in the above range, an appropriate crosslinking density is maintained, a crosslinking degree and adhesion are excellent, and the appearance and gloss of the coating film can be improved due to excellent workability.

Photopolymerization Initiator, Solvent, and Additives

The undercoat composition may further include a photopolymerization initiator and a solvent, and, if necessary, may further include one or more additives such as an ultraviolet absorber, a coupling agent, an adhesion enhancer, and a leveling agent.

The photopolymerization initiator may be excited by ultraviolet rays to initiate photopolymerization, and conventional photopolymerization initiators in the relevant technical field can be used without limitation.

Examples of the photopolymerization initiators may include Irgacure 184, Irgacure 369, Irgacure 651, Irgacure 819, Irgacure 907, benzionalkylether, benzophenone, benzyl dimethyl katal, hydroxycyclohexyl phenylacetone, chloro-acetophenone, 1,1-dichloro acetophenone, diethoxy acetophenone, hydroxy acetophenone, 2-chloro thioxanthone, 2-ETAQ (2-ethylanthraquinone), 1-hydroxy-cyclohexyl-phenyl-ketone, 2-hydroxy-2-methyl-1-phenyl-1-propanone, 2-hydroxy-1-[4-(2-hydroxyethoxy)phenyl]-2-methyl-1-propanone, methylbenzoylformate, and the like, and these are used alone or in a mixture of two or more types.

An absorption wavelength of the photopolymerization initiator may not be particularly limited as long as it can absorb ultraviolet rays, and may be, for example, in the range of about 240 nm to about 340 nm.

The photopolymerization initiator may be included in an amount of about 1 wt % to about 10 wt %, for example, about 2 wt % to about 8 wt %, based on the total amount of the undercoat composition. When the photopolymerization initiator is included in the above range, the strength and adhesion of the coating film are improved.

The solvent may not be particularly limited as long as it can easily dissolve the components of the urethane (meth)acrylate oligomer and (meth)acrylate monomer and can control the viscosity to a low level.

Examples of solvents may include a ketone-based solvent, an ester-based solvent, an ether-based solvent, an alcohol-based solvent, and a mixture thereof. For example, the solvent may include propylene glycol methyl ether, toluene, xylene, methyl ethyl ketone, methyl propyl ketone, methyl butyl ketone, methyl isobutyl ketone, ethyl propyl ketone, methyl acetate, ethyl acetate, normal propyl acetate, isopropyl acetate, butyl acetate, methyl cellosolve acetate, cellosolve acetate, butyl cellosolve acetate, carbitol acetate, methanol, ethanol, normal propanol, isopropanol, normal butanol, isobutanol, tertiary butanol, benzene, acetone, tetrahydrofuran, dimethyl formaldehyde, cyclohexanone, etc., but is not limited to these. The solvents may be used alone, or two or more types may be mixed.

The solvent may be included in a balance amount, for example, about 30 wt % to about 60 wt % based on a total amount of the undercoat composition.

An amount of the additive is not particularly limited and, for example, may be included in about 0.1 wt % to about 10 wt % based on a total amount of the undercoat composition.

The additive may be a conventional ultraviolet absorber known in the art. The ultraviolet absorber may use a triazine-based compound, but is not limited thereto. The ultraviolet absorber may be, for example, a hydroxyphenyl-triazine derivative having two or more ultraviolet absorbing ester groups which may be used alone or in combination of two or more types.

A thickness of the undercoating layer 200 may be about 10 μm to about 25 μm, for example about 15 μm to about 22 μm. When the thickness of the undercoating layer is within the above range, adhesion to the metal layer is improved, and the curing reaction is improved, thereby improving mechanical properties.

[Topcoat Layer]

The topcoat layer 400 may be formed of a topcoat composition. Hereinafter, the topcoat composition will be described.

The topcoat composition may be an ultraviolet curable paint composition, which includes a hexa-functional or higher urethane (meth)acrylate oligomer, a bi-functional urethane (meth)acrylate oligomer, a penta-functional urethane (meth)acrylate oligomer, and a tri-functional or lower (meth)acrylate monomer. The descriptions that are not separately described below regarding these components are the same as the descriptions of the undercoat composition described above, and thus the descriptions thereof have been omitted, and the above descriptions should be referred to for the relevant descriptions.

By using three types of oligomers with different functional groups, the curing reaction rate and surface tension of the topcoat composition can be adjusted to improve adhesion to the metal layer having an island structure, and a crosslink density of the coating film can be adjusted to improve appearance, gloss and mechanical properties can be improved.

The topcoat composition improves adhesion to the metal layer 300 and can suppress ultraviolet rays from reaching the metal layer, thereby providing excellent chemical resistance, water resistance, and accelerated weathering resistance.

Hexa-Functional or Higher Urethane (Meth)Acrylate Oligomer

A weight average molecular weight (Mw) of the hexa-functional or higher urethane (meth)acrylate oligomer may be about 500 g/mol to about 5,000 g/mol, for example about 1,000 to about 4,000 g/mol. A viscosity (60° C.) of the hexa-functional or higher urethane (meth)acrylate oligomer may be about 1,000 cP to about 5,000 cP, for example about 1,500 cP to about 4,500 cP. When the hexa-functional or higher urethane (meth)acrylate oligomer has a weight average molecular weight and viscosity (60° C.) in the above range, the hardness, adhesion, and gloss of the coating film are improved, and an appearance of the coating film is improved due to improved workability.

The hexa-functional or higher urethane (meth)acrylate oligomer may be included in an amount of about 1 wt % to about 8 wt %, for example, about 2 wt % to about 6 wt %, based on a total amount of the topcoat composition. When the hexa-functional or higher urethane (meth)acrylate oligomer is included in the above range, curability, chemical resistance, weather resistance, and adhesion of the coating film as well as elasticity, appearance, and scratch resistance of the coating film are improved by maintaining an appropriate crosslinking density.

Bi-Functional Urethane (Meth)Acrylate Oligomer

The bi-functional urethane (meth)acrylate oligomer may be a urethane (meth)acrylate oligomer that has two polymerizable functional groups, which are unsaturated groups, and serves to improve durability, adhesion, and flexibility of the coating film.

A weight average molecular weight (Mw) of the bi-functional urethane (meth)acrylate oligomer may be about 5,000 g/mol to about 20,000 g/mol, for example, about 7,000 g/mol to about 17,000 g/mol. A viscosity (60° C.) of the bi-functional urethane (meth)acrylate oligomer may be about 10,000 cP to about 20,000 cP, for example about 13,000 cP to about 17,000 cP. When the bi-functional urethane (meth)acrylate oligomer has a weight average molecular weight and viscosity (60° C.) in the above range, the adhesion and gloss of the coating film are excellent, and the appearance of the coating film can be improved due to excellent workability.

The bi-functional urethane (meth)acrylate oligomer may be included in an amount of about 5 wt % to about 15 wt %, for example about 7 wt % to about 13 wt % based on a total amount of the topcoat composition. When the bi-functional urethane (meth)acrylate oligomer is included in the above range, the chemical resistance, weather resistance, and adhesion of the coating film are excellent by maintaining an appropriate crosslinking density, and the appearance of the coating film can be improved due to excellent workability.

Penta-Functional Urethane (Meth)Acrylate Oligomer

The penta-functional urethane (meth)acrylate oligomers may be a urethane (meth)acrylate oligomer that has five polymerizable functional groups, which are unsaturated groups, and serves to improve durability, adhesion, and flexibility of the coating film.

A weight average molecular weight (Mw) of the penta-functional urethane (meth)acrylate oligomer may be about 5,000 g/mol to about 10,000 g/mol, for example about 6,000 g/mol to about 9,000 g/mol. A viscosity (60° C.) of the penta-functional urethane (meth)acrylate oligomer may be about 500 cP to about 3,000 cP, for example about 1,000 cP to about 2,500 cP. When the penta-functional urethane (meth)acrylate oligomer has a weight average molecular weight and viscosity (60° C.) in the above ranges, the adhesion and gloss of the coating film are excellent, and the workability is improved, so that the appearance and weather resistance of the coating film can be improved.

The penta-functional urethane (meth)acrylate oligomer may be included in an amount of about 5 wt % to about 15 wt %, for example about 7 wt % to about 13 wt % based on a total amount of the topcoat composition. When the penta-functional urethane (meth)acrylate oligomer is included in the above range, the chemical resistance, weather resistance, and adhesion of the coating film are excellent by maintaining an appropriate crosslinking density, and the appearance of the coating film can be improved due to excellent workability.

Tri-Functional or Lower (Meth)Acrylate Monomer

The tri-functional or lower (meth)acrylate monomer may include a mono-functional urethane (meth)acrylate monomer and a tri-functional (meth)acrylate monomer.

The tri-functional or lower (meth)acrylate monomer may be included in an amount of about 18 wt % to about 28 wt % based on a total amount of the topcoat composition. In addition, when the tri-functional or lower (meth)acrylate monomer includes a mono-functional (meth)acrylate monomer and a tri-functional (meth)acrylate monomer, the mono-functional (meth)acrylate monomer may be included in an amount of about 1 wt % to about 5 wt % based on a total amount of the topcoat composition and the tri-functional (meth)acrylate monomer may be included in an amount of 15 wt % to 25 wt % based on a total amount of the topcoat composition. When the tri-functional or lower (meth)acrylate monomer is included in the above range, an appropriate crosslinking density may be maintained, a crosslinking degree and adhesion are improved, and appearance and gloss of the coating film may be improved due to excellent workability.

The topcoat composition may further include a photopolymerization initiator and a solvent, and, if necessary, may further include one or more additives such as a coupling agent, an adhesion enhancer, and a leveling agent.

A thickness of the topcoat layer 400 may be about 10 μm to about 25 μm, for example, about 15 μm to about 22 82 m. When the thickness of the topcoat layer is within the above range, adhesion to the metal layer is improved, and the curing reaction is improved, thereby improving mechanical properties.

The coating film for an automobile exterior according to an embodiment, that is, the coating film including the metal layer 300 formed by depositing aluminum (Al) and a low melting point metal in an island structure, the undercoat layer 200 formed of an undercoat composition and disposed under the metal layer 300 to protect the metal layer 300, and the topcoat layer 400 formed of a topcoat composition and disposed on the metal layer 300 to protect the metal layer 300 may not only improve electromagnetic wave transmission performance and provide a surface treatment effect for a high-quality feel of parts, but it also has excellent adhesion, chemical resistance, water resistance, and accelerated weathering resistance, making it useful even in very harsh automotive exterior environments.

Hereinafter, the embodiments are illustrated in more detail with reference to examples. However, these examples are exemplary, and the scope of claims is not limited thereto.

Examples 1 to 11 and Comparative Examples 1 to 15: Change in Undercoat Composition An undercoat composition having each following composition shown in Tables 1 and 2 was coated on an ABS (acrylonitrile-butadiene-styrene) substrate, dried at IR 50° C./3 min, and irradiated by ultraviolet (UV) with 1,500 mJ/cm$^2$ to form a 20 μm-thick undercoat layer. On the formed undercoat layer, Al and tin were vacuum-deposited (PVD) into an island structure to form a 0.1 μm-thick metal layer. On the formed metal layer, a topcoat composition was applied, dried at IR 50° C./3 min, and irradiated by ultraviolet (UV) with 3,000 mJ/cm$^2$ to form a 20 μm-thick topcoat, resultantly obtaining a coating film for automobile exterior.

Herein, the topcoat composition contained 10 wt % of a bifunctional aliphatic urethane acrylate oligomer (Mw: 12,300 g/mol, viscosity (60° C.): 15,700 cP), 10 wt % of a 5 functional aliphatic urethane acrylate oligomer (Mw: 7,500 g/mol, viscosity (60° C.): 2,000 cP), 5 wt % of a 6 functional aliphatic urethane acrylate oligomer (Mw: 2,500 g/mol, viscosity (60° C.): 3,000 cP), 3 wt % of isobornyl acrylate (IBOA), 10 wt % of trimethylolpropane triacrylate (TMPTA), 10 wt % of pentaerythritol triacrylate (PETA), 40 wt % of ethyl acetate as a solvent, 5 wt % of 1-hydroxycyclohexyl-phenyl-ketone as a photopolymerization initiator, and 7 wt % of 2-hydroxyphenyl-S-triazine as an ultraviolet (UV) absorber.

TABLE 1

(unit: wt %)

| | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| (1) Tri-functional urethane (meth)acrylate oligomer | 15 | 20 | 10 | 15 | 15 | 15 | 15 | 15 | 15 | 15 | 15 |
| (2) Tetra-functional urethane (meth)acrylate oligomer | 10 | 5 | 15 | 10 | 10 | 10 | 10 | 10 | 10 | 10 | 10 |
| (3) Hexa-functional urethane (meth)acrylate oligomer | 5 | 5 | 5 | 1 | 8 | 5 | 5 | 5 | 5 | 5 | 5 |
| (4) Bi-functional urethane (meth)acrylate oligomer | — | — | — | — | — | — | — | — | — | — | — |
| (5) Penta-functional urethane (meth)acrylate oligomer | — | — | — | — | — | — | — | — | — | — | — |
| (6) Bi-functional (meth)acrylate monomer | 10 | 10 | 10 | 10 | 10 | 5 | 15 | 10 | 10 | 10 | 10 |
| (7) Tri-functional (meth)acrylate monomer | 10 | 10 | 10 | 10 | 10 | 15 | 5 | 5 | 15 | 10 | 10 |
| (8) Solvent | 40 | 40 | 40 | 44 | 37 | 40 | 40 | 45 | 35 | 43 | 37 |
| (9) Photopolymerization initiator | 5 | 5 | 5 | 5 | 5 | 5 | 5 | 5 | 5 | 2 | 8 |
| (10) Ultraviolet absorber | 5 | 5 | 5 | 5 | 5 | 5 | 5 | 5 | 5 | 5 | 5 |
| Total | 100 | 100 | 100 | 100 | 100 | 100 | 100 | 100 | 100 | 100 | 100 |

TABLE 2

(unit: wt %)

| | Comparative Examples | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| (1) | 9 | 21 | 15 | 15 | 15 | 15 | 15 | 15 | 15 | 15 | — | — | 20 | — | 20 |
| (2) | 10 | 10 | 4 | 16 | 10 | 10 | 10 | 10 | 10 | 10 | 10 | 10 | 10 | 20 | — |

TABLE 2-continued (unit: wt %)

| | Comparative Examples | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| (3) | 5 | 5 | 5 | 5 | 0.9 | 9 | 5 | 5 | 5 | 5 | 5 | 5 | — | 5 | 5 |
| (4) | — | — | — | — | — | — | — | — | — | — | 15 | — | — | — | — |
| (5) | — | — | — | — | — | — | — | — | — | — | — | 15 | — | — | — |
| (6) | 10 | 10 | 10 | 10 | 10 | 10 | 4 | 16 | 10 | 10 | 10 | 10 | 10 | 10 | 10 |
| (7) | 10 | 10 | 10 | 10 | 10 | 10 | 10 | 10 | 4 | 16 | 10 | 10 | 10 | 10 | 10 |
| (8) | 46 | 34 | 46 | 34 | 44.1 | 36 | 46 | 34 | 46 | 34 | 40 | 40 | 40 | 45 | 45 |
| (9) | 5 | 5 | 5 | 5 | 5 | 5 | 5 | 5 | 5 | 5 | 5 | 5 | 5 | 5 | 5 |
| (10) | 5 | 5 | 5 | 5 | 5 | 5 | 5 | 5 | 5 | 5 | 5 | 5 | 5 | 5 | 5 |
| Total | 100 | 100 | 100 | 100 | 100 | 100 | 100 | 100 | 100 | 100 | 100 | 100 | 100 | 100 | 100 |

(1) Tri-functional urethane acrylate oligomer: Tri-functional aliphatic urethane acrylate oligomer (Mw 2,200 g/mol, viscosity (60° C. 19,500 cP)

(2) Tetra-functional urethane acrylate oligomer: Tetra-functional aliphatic urethane acrylate oligomer (Mw: 1,260 g/mol, viscosity (60° C.): 2,270 cP)

(3) Hexa-functional urethane acrylate oligomer: Hexa-functional aliphatic urethane acrylate oligomer (Mw: 1,650 g/mol, viscosity (60° C.): 2,490 cP)

(4) Bi-functional urethane acrylate oligomer: Bi-aliphatic urethane acrylate oligomer (Mw: 2,450 g/mol, viscosity (60° C.): 20,500 cP)

(5) Penta-functional urethane acrylate oligomer: Penta-functional aliphatic urethane acrylate oligomer (Mw: 1,350 g/mol, viscosity (60° C.): 2,310 cP)

(6) Bi-functional acrylate monomer: 1,6-hexanediol diacrylate (HDDA)

(7) Tri-functional acrylate monomer: Pentaerythritol triacrylate (PETA)

(8) Solvent: Ethyl acetate (9) Photopolymerization initiator: 1-hydroxy-cyclohexyl-phenyl-ketone (10) Ultraviolet absorber: 2-hydroxyphenyl-S-triazine Examples 12 to 22 and Comparative Examples 16 to 28: Change in Topcoat Composition An undercoat composition was applied on an ABS (acrylonitrile-butadiene-styrene) substrate, dried at IR 50° C./3 min, and irradiated by ultraviolet (UV) with 1,500 mJ/cm² to form a 20 μm-thick undercoat layer. On the undercoat layer, Al and tin were vacuum-deposited (PVD) into an island structure to form a 0.1 μm-thick metal layer. On the metal layer, a topcoat composition was applied according to a composition shown in Tables 3 and 4, dried at IR 50° C./3 min, and irradiated by ultraviolet (UV) with 3,000 mJ/cm² to form a 20 m-thick topcoat and resultantly, manufacture a coating film for automobile exterior.

Herein, the undercoat composition contained 15 wt % of a trifunctional aliphatic urethane acrylate oligomer (Mw=2,000 g/mol, viscosity (60° C.)=19,500 cP), 10 wt % of a 4-functional aliphatic urethane acrylate oligomer (Mw=1,260 g/mol, viscosity (60° C.)=2,270 cP), 5 wt % of a 6-functional aliphatic urethane acrylate oligomer (Mw=1,650 g/mol, viscosity (60° C.)=2,490 cP), 10 wt % of 1,6-hexanediol diacrylate (HDDA), 10 wt % of pentaerythritol triacrylate (PETA), 40 wt % of ethyl acetate as a solvent, 5 wt % of 1-hydroxy-cyclohexyl-phenyl-ketone as a photopolymerization initiator, and 5 wt % of 2-hydroxyphenyl-S-triazine as an ultraviolet (UV) absorber.

TABLE 3

(unit: wt %)

| | Examples | | | | | | | | | | |
|---|---|---|---|---|---|---|---|---|---|---|---|
| | 12 | 13 | 14 | 15 | 16 | 17 | 18 | 19 | 20 | 21 | 22 |
| (11) Bi-functional urethane acrylate oligomer | 10 | 5 | 15 | 10 | 10 | 10 | 10 | 10 | 10 | 10 | 10 |
| (12) Penta-functional urethane acrylate oligomer | 10 | 15 | 5 | 10 | 10 | 10 | 10 | 10 | 10 | 10 | 10 |
| (13) Hexa-functional urethane acrylate oligomer | 5 | 5 | 5 | 1 | 8 | 5 | 5 | 5 | 5 | 5 | 5 |
| (14) Tri-functional urethane acrylate oligomer | — | — | — | — | — | — | — | — | — | — | — |
| (15) Tetra-functional urethane acrylate oligomer | — | — | — | — | — | — | — | — | — | — | — |
| (16) Mono-functional acrylate monomer | 3 | 3 | 3 | 3 | 3 | 1 | 5 | 3 | 3 | 3 | 3 |
| (17) Tri-functional acrylate monomer | 10 | 10 | 10 | 10 | 10 | 10 | 10 | 5 | 10 | 10 | 10 |
| (18) Tri-functional acrylate monomer | 10 | 10 | 10 | 10 | 10 | 10 | 10 | 10 | 15 | 10 | 10 |

TABLE 3-continued (unit: wt %)

| | Examples | | | | | | | | | | |
|---|---|---|---|---|---|---|---|---|---|---|---|
| | 12 | 13 | 14 | 15 | 16 | 17 | 18 | 19 | 20 | 21 | 22 |
| (19) Solvent | 40 | 40 | 40 | 44 | 37 | 42 | 38 | 45 | 35 | 43 | 37 |
| (20) Photopolymerization initiator | 5 | 5 | 5 | 5 | 5 | 5 | 5 | 5 | 5 | 2 | 8 |
| (21) Ultraviolet absorber | 7 | 7 | 7 | 7 | 7 | 7 | 7 | 7 | 7 | 7 | 7 |
| Total | 100 | 100 | 100 | 100 | 100 | 100 | 100 | 100 | 100 | 100 | 100 |

TABLE 4

(unit: wt %)

| | Comparative Examples | | | | | | | | | | | | |
|---|---|---|---|---|---|---|---|---|---|---|---|---|---|
| | 16 | 17 | 18 | 19 | 20 | 21 | 22 | 23 | 24 | 25 | 26 | 27 | 28 |
| (11) | 4 | 16 | 15 | 15 | 15 | 15 | 10 | 10 | — | — | 10 | — | 10 |
| (12) | 10 | 10 | 4 | 16 | 10 | 10 | 10 | 10 | 10 | 10 | 10 | 10 | — |
| (13) | 5 | 5 | 5 | 5 | 0.9 | 9 | 5 | 5 | 5 | 5 | — | 5 | 5 |
| (14) | — | — | — | — | — | — | — | — | 10 | — | — | — | — |
| (15) | — | — | — | — | — | — | — | — | — | 10 | — | — | — |
| (16) | 10 | 10 | 10 | 10 | 10 | 10 | 3 | 3 | 10 | 10 | 10 | 10 | 10 |
| (17) | 10 | 10 | 10 | 10 | 10 | 10 | 4 | 11 | 10 | 10 | 10 | 10 | 10 |
| (18) | — | — | — | — | — | — | 9 | 16 | — | — | — | — | — |
| (19) | 51 | 39 | 46 | 34 | 44.1 | 36 | 47 | 33 | 45 | 45 | 50 | 55 | 55 |
| (20) | 5 | 5 | 5 | 5 | 5 | 5 | 5 | 5 | 5 | 5 | 5 | 5 | 5 |
| (21) | 5 | 5 | 5 | 5 | 5 | 5 | 7 | 7 | 5 | 5 | 5 | 5 | 5 |
| Total | 100 | 100 | 100 | 100 | 100 | 100 | 100 | 100 | 100 | 100 | 100 | 100 | 100 |

(11) Bi-functional urethane acrylate oligomer: Bi-functional aliphatic urethane acrylate oligomer (Mw 12,300 g/mol, viscosity (60° C.) 15,700 cP)
(12) Penta-functional urethane acrylate oligomer: Penta-functional aliphatic urethane acrylate oligomer (Mw 7,500 g/mol, viscosity (60° C.) 2,000 cP)
(13) Hexa-functional urethane acrylate oligomer: Hexa-functional aliphatic urethane acrylate oligomer (Mw 2,500 g/mol, viscosity (60° C.) 3,000 cP)
(14) Tri-functional urethane acrylate oligomer: Tri-functional aliphatic urethane acrylate oligomer (Mw 11,500 g/mol, viscosity (60° C.) 14,200 cP)
(15) Tetra-functional urethane acrylate oligomer: Tetra-functional aliphatic urethane acrylate oligomer (Mw 10,200 g/mol, viscosity (60° C.) 12,100 cP)
(16) Mono-functional acrylate monomer: isobornyl acrylate (IBOA)
(17) Tri-functional acrylate monomer: trimethylolpropane triacrylate (TMPTA)
(18) Tri-functional acrylate monomer: pentaerythritol triacrylate (PETA)
(19) Solvent: ethyl acetate
(20) Photopolymerization initiator: 1-hydroxy-cyclohexyl-phenyl-ketone
(21) Ultraviolet absorber: 2-hydroxyphenyl-S-triazine Evaluation 1: SEM Analysis FIG. 2 is a scanning electron microscope (SEM) image of the metal layer according to Example 1.

Figure 2:
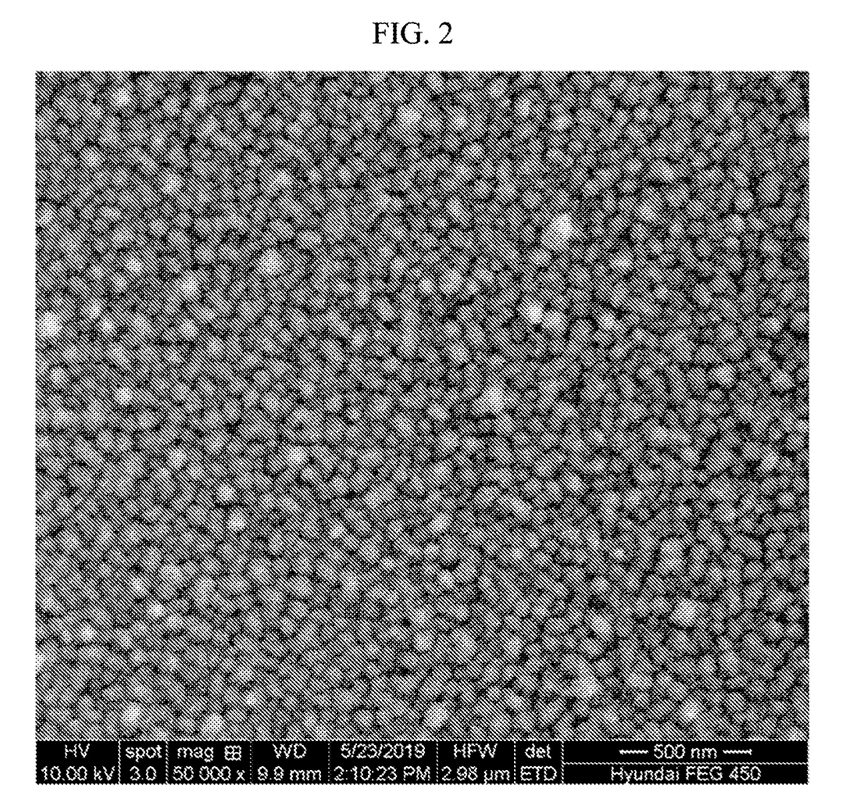
FIG. 2 is a scanning electron microscope (SEM) image of the metal layer according to Example 1.

Referring to FIG. 2, in the metal layer according to an embodiment, aluminum (Al) and a low melting point metal were deposited in an island structure.

Evaluation 2: Physical Property Evaluation

Each of the coating films (specimens) for automobile exterior according to Examples 1 to 22 and Comparative Examples 1 to 28 were measured with respect to properties in the following methods, and the results are shown in Tables 5 and 6.

Adhesion

Adhesion was measured according to JIS K5600-5-6 in cross-cut and tape tests. Whether or not each of the UV coating films was peeled off was checked by using a cross cutter to scratch the undercoat layer surface having a size of horizontal 10 cells and vertical 10 cells and thus 100 cells in total, wherein each cell had a size 1 mm×1 mm, attaching a Nichiban tape thereon, and counting the number of cells still holding the UV coating film, when the tape was detached.

<Evaluation Criteria>

Excellent (◉): 99 cells or more maintained film adhesion
Good (○): 95 or more and less than 99 cells maintained film adhesion
Average (Δ): 85 or more cells and less than 95 maintained film adhesion
Inferior (X): less than 85 cells maintained film adhesion Water Resistance Each specimen was allowed to stand at 45° C. under RH of 95% for 10 days and examined with respect to discoloration, fading, swelling, cracking, gloss loss, peeling, etc.

Corrosion Resistance

Each specimen was examined with respect to a corrosion state by placing a mixed solution of sodium chloride (5%), acetic acid (PH: 3), copper(II) chloride (0.268 g/l) in a test chamber and spraying it into each specimen for 10 days, while maintaining 50° C.

Chipping Resistance

After conducting a chipping resistance test on each specimen by using a Gravelo meter (SAE J 400 standard product) under the following conditions, the specimen was examined with respect to significant cracks, scratches, etc. and adhesion or not.

Chipping resistance test conditions: Shooting Distance; 100 mm, Shooting Angle; 45°, Shooting Pressure; 4.0 kgf/cm2, Test Temperature; −40° C., 50 g of stone (JIS Crushed gravel No 7 stone, 2.5 to 5 mm, 350 to 400 pieces)

Heat Resistance

Each specimen was allowed to stand for 10 days at a test temperature (120° C.), then, taken out and allowed to stand again at room temperature for 1 hour, and then, examined with respect to discoloration, fading, swelling, cracking, gloss loss, peeling, etc.

Adhesion to Deposition Surface

Adhesion was measured in cross-cut and tape tests according to JIS K5600-5-6. Whether each of the UV coating films was peeled off or not was checked by using a cross cutter to scratch the undercoat layer surface with a size of horizontal 10 cells and vertical 10 cells and thus 100 cells in total, wherein each cell had a size 1 mm×1 mm, attaching a Nichiban tape thereon, and counting the number of cells still holding the UV coating film, when the tape was detached.

<Evaluation Criteria>
Excellent (◉): 99 or more cells maintained film adhesion
Good (○): 95 or more and less than 99 cells maintained film adhesion
Average (Δ): 85 or more and less than 95 cells maintained film adhesion
Inferior (X): less than 85 cells maintained film adhesion Water Resistance Each specimen was allowed to stand at 40° C. for 10 days, then, taken out and allowed to stand again at room temperature for 1 hour, and then, examined with respect to discoloration, fading, swelling, cracking, gloss loss, peeling, etc.

Accelerated Weather Resistance

Each specimen was irradiated under the following conditions of a xenon arc furnace according to SAE J 2527 and then, evaluated with respect to significant discoloration [color difference (E*): 3.0 or less], fading, swelling, cracking, gloss loss, etc. and adhesion or not.

Xenon arc furnace-setting conditions: 4,000 kJ/m$^2$ [340 nm], BLACK PNL temperature (LIGHT)—38±2° C. (DARK) 40 minutes irradiation (50±5% RH), cycle—60 minutes irradiation (50±5% RH) 60 minutes non-irradiation (95±5% RH), irradiation roughness—0.55±0.02 W/(m$^2$·nm) [340 nm]

TABLE 5

| | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| Adhesion | ◉ | ◉ | ○ | ◉ | ◉ | ◉ | ◉ | ◉ | ◉ | ◉ | ◉ |
| Water resistance | ◉ | ○ | ◉ | ◉ | ◉ | ◉ | ◉ | ◉ | ○ | ◉ | ○ |
| Corrosion resistance | ◉ | ◉ | ◉ | ○ | ◉ | ◉ | ◉ | ◉ | ◉ | ○ | ○ |
| Chipping resistance | ◉ | ◉ | ◉ | ◉ | ○ | ◉ | ◉ | ◉ | ◉ | ○ | ◉ |
| Heat resistance | ◉ | ◉ | ◉ | ◉ | ◉ | ◉ | ○ | ○ | ◉ | ◉ | ◉ |
| Adhesion to deposition surface | ◉ | ◉ | ◉ | ◉ | ◉ | ○ | ◉ | ◉ | ◉ | ◉ | ◉ |
| Water resistance | ◉ | ○ | ◉ | ◉ | ◉ | ◉ | ◉ | ◉ | ○ | ◉ | ○ |
| Accelerated weather resistance | ◉ | ◉ | ◉ | ◉ | ◉ | ◉ | ○ | ○ | ◉ | ◉ | ◉ |

| | Comparative Examples | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Adhesion | ○ | ○ | ○ | ○ | ○ | ○ | ○ | ○ | ○ | ○ | ○ | ○ | ○ | Δ | ○ |
| Water resistance | X | ○ | Δ | X | Δ | Δ | Δ | Δ | Δ | Δ | ○ | ○ | Δ | ○ | X |
| Corrosion resistance | ○ | ○ | ○ | ○ | ○ | ○ | ○ | ○ | ○ | X | X | X | X | X | X |
| Chipping resistance | ○ | ○ | ○ | ○ | ○ | ○ | ○ | X | ○ | X | X | X | X | X | X |
| Heat resistance | X | X | X | Δ | ○ | X | X | ○ | X | ○ | ○ | ○ | ○ | Δ | ○ |
| Adhesion to deposition surface | X | X | X | X | X | X | X | X | X | X | ○ | X | Δ | ○ | ○ |
| Water resistance | X | ○ | Δ | X | Δ | Δ | Δ | Δ | Δ | Δ | ○ | ○ | Δ | ○ | X |
| Accelerated weather resistance | X | X | X | Δ | ○ | X | X | ○ | X | ○ | ○ | ○ | ○ | Δ | ○ |

(◉: Excellent, ○: Good, Δ: Average, X: Inferior)

TABLE 6

| | Examples | | | | | | | | | | |
|---|---|---|---|---|---|---|---|---|---|---|---|
| | 12 | 13 | 14 | 15 | 16 | 17 | 18 | 19 | 20 | 21 | 22 |
| Adhesion | ◉ | ◉ | ◉ | ◉ | ◉ | ○ | ◉ | ◉ | ◉ | ◉ | ◉ |
| Water resistance | ◉ | ○ | ◉ | ◉ | ◉ | ◉ | ◉ | ◉ | ○ | ◉ | ○ |
| Corrosion resistance | ◉ | ◉ | ◉ | ○ | ◉ | ◉ | ◉ | ○ | ○ | ○ | ○ |
| Chipping resistance | ◉ | ◉ | ◉ | ◉ | ○ | ◉ | ◉ | ○ | ◉ | ○ | ◉ |
| Heat resistance | ◉ | ◉ | ◉ | ◉ | ◉ | ◉ | ○ | ◉ | ◉ | ◉ | ◉ |
| Adhesion to deposition surface | ◉ | ◉ | ◉ | ◉ | ◉ | ○ | ◉ | ◉ | ◉ | ◉ | ◉ |

TABLE 6-continued

| | | | | | | | | | | | |
|---|---|---|---|---|---|---|---|---|---|---|---|
| Water resistance | ◎ | ○ | ◎ | ◎ | ◎ | ◎ | ◎ | ◎ | ○ | ◎ | ○ |
| Accelerated weather resistance | ◎ | ◎ | ◎ | ◎ | ◎ | ◎ | ○ | ◎ | ◎ | ◎ | ◎ |

| | Comparative Examples | | | | | | | | | | | | |
|---|---|---|---|---|---|---|---|---|---|---|---|---|---|
| | 16 | 17 | 18 | 19 | 20 | 21 | 22 | 23 | 24 | 25 | 26 | 27 | 28 |
| Adhesion | X | X | X | X | X | X | X | X | ○ | ○ | Δ | ○ | ○ |
| Water resistance | X | ○ | Δ | X | Δ | Δ | Δ | X | ○ | ○ | Δ | ○ | Δ |
| Corrosion resistance | ○ | X | ○ | ○ | X | ○ | X | ○ | X | X | X | X | X |
| Chipping resistance | ○ | ○ | X | ○ | ○ | ○ | ○ | ○ | ○ | X | X | X | X |
| Heat resistance | X | X | X | Δ | ○ | X | ○ | Δ | ○ | ○ | X | Δ | ○ |
| Adhesion to deposition surface | X | X | X | X | X | X | X | X | ○ | ○ | Δ | ○ | ○ |
| Water resistance | X | ○ | Δ | X | Δ | Δ | Δ | X | ○ | ○ | Δ | ○ | Δ |
| Accelerated weather resistance | X | X | X | Δ | ○ | X | ○ | Δ | ○ | ○ | X | Δ | ○ |

(◎: Excellent, ○: Good, Δ: Average, X: Inferior)

Referring to Table 5, each of the films of Examples 1 to 11 showing each composition of various undercoat compositions, compared with Comparative Examples 1 to 15, exhibited excellent adhesion, moisture resistance, corrosion resistance, chipping resistance, heat resistance, water resistance, and accelerated weather resistance.

Specifically, each of the undercoat composition according to Comparative Examples 1 and 2 having a content of a tri-functional urethane (meth)acrylate oligomer beyond the range of an embodiment; Comparative Examples 3 and 4 having a content of a tetra-functional urethane (meth)acrylate oligomer beyond the range of an embodiment; Comparative Examples 5 and 6 having a content of a hexa-functional or higher urethane (meth)acrylate oligomer beyond the range of an embodiment; Comparative Examples 7 to 10 having a content of a tri-functional or lower (meth)acrylate monomer beyond the range of an embodiment; Comparative Examples 11, 12, and 14 using no tri-functional urethane (meth)acrylate oligomer; Comparative Example 13 using no hexa-functional or higher functional urethane (meth)acrylate oligomer; and Comparative Example 15 using no tetra-functional urethane (meth)acrylate oligomer turned out not to satisfy properties required in very harsh automobile exterior environments.

In addition, referring to Table 6, the films according to Examples 12 to 22 showing each composition of various topcoat compositions, compared with the films according to Comparative Examples 16 to 28, exhibited excellent adhesion, water resistance, corrosion resistance, chipping resistance, heat resistance, water resistance, and accelerated weather resistance.

Specifically, each of the topcoat compositions according to Comparative Examples 16 and 17 having a content of a bi-functional urethane (meth)acrylate oligomer beyond the range of an embodiment; Comparative Examples 18 and 19 having a content of a penta-functional urethane (meth)acrylate oligomer beyond the range of an embodiment; Comparative Examples 20 and 21 having a content of a hexa-functional or higher urethane (meth)acrylate oligomer beyond the range of an embodiment; Comparative Examples 22 to 23 having a content of a tri-functional or lower (meth)acrylate monomer beyond the range of an embodiment; Comparative Examples 24, 25, and 27 having no bi-functional urethane (meth)acrylate oligomer; Comparative Example 26 having no hexa-functional or higher urethane (meth)acrylate oligomer; and Comparative Example 28 using no penta-functional urethane (meth)acrylate oligomer turned out not to satisfy properties required in very harsh automobile exterior environments.

Evaluation 3: Electromagnetic Wave Transmission Performance

The film manufactured in Example 1 was measured with respect to electromagnetic wave transmission performance. The transmission performance for frequencies around 76.5 GHz was measured by using an electromagnetic wave transmission and reception evaluation equipment consisting of a network analyzer and an antenna. The measurement results are expressed by using dB (decibel).

As a result of the measurement, in the film of Example 1, an island-structured deposition layer was successfully formed, and also, an electromagnetic wave loss of about −0.1 dB, which confirmed that electromagnetic waves were well transmitted.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

10: coating film for automobile exterior
100: substrate
200: undercoat layer
300: metal layer
400: topcoat layer

What is claimed is:

1. A coating film, comprising
a substrate;
an undercoat layer disposed on the substrate and comprising an undercoat composition;
a metal layer deposited in an island structure on the undercoat layer and comprising aluminum (Al) and a low melting point metal; and
a topcoat layer disposed on the metal layer and comprising a topcoat composition,
wherein the low melting point material comprises tin, indium, tin alloy, or a combination thereof,
wherein the undercoat composition comprises a hexa-functional or higher urethane meth)acrylate oligomer, a tri-functional urethane (meth)acrylate oligomer, a tetra-functional urethane (meth)acrylate oligomer, and a tri-functional or lower (meth)acrylate monomer, and
wherein the topcoat composition comprises a hexa-functional or higher urethane (meth)acrylate oligomer, a bi-functional urethane (meth)acrylate oligomer, a penta-functional urethane (meth)acrylate oligomer, and a tri-functional or lower (meth)acrylate monomer.

2. The coating film of claim 1, wherein
in the undercoat composition, the tri-functional urethane (meth)acrylate oligomer is included in a higher content than each of the hexa-functional or higher urethane (meth)acrylate oligomer and the tetra-functional urethane (meth)acrylate oligomer.

3. The coating film of claim 1, wherein
the undercoat composition includes 1 wt % to 8 wt % of the hexa-functional or higher urethane (meth)acrylate oligomer, 10 wt % to 20 wt % of the tri-functional urethane (meth)acrylate oligomer, 5 wt % to 15 wt % of the tetra-functional urethane (meth)acrylate oligomer, and 15 wt % to 25 wt % of the tri-functional or lower (meth)acrylate monomer based on a total amount of the undercoat composition.

4. The coating film of claim 1, wherein
the hexa-functional or higher urethane (meth)acrylate oligomer in the undercoat composition has a weight average molecular weight of 500 g/mol to 3,000 g/mol, and a viscosity at 60° C. of 1,000 cP to 4,000 cP.

5. The coating film of claim 1, wherein
the tri-functional urethane (meth)acrylate oligomer in the undercoat composition has a weight average molecular weight of 1,500 g/mol to 3,000 g/mol and a viscosity at 60° C. of 10,000 cP to 30,000 cP.

6. The coating film of claim 1, wherein
the tetra-functional urethane (meth)acrylate oligomer in the undercoat composition has a weight average molecular weight of 500 g/mol to 2,000 g/mol and a viscosity at 60° C. of 1,000 cP to 3,500 cP.

7. The coating film of claim 1, wherein
the tri-functional or lower (meth)acrylate monomer in the undercoat composition includes 5 wt % to 15 wt % of a bi-functional (meth) crylate monomer and 5 wt % to 15 wt % of tri-functional (meth)acrylate monomer based on a total amount of the undercoat composition.

8. The coating film of claim 1, wherein
a thickness of the undercoat layer is 10 μm to 25 μm.

9. The coating film of claim 1, wherein
a thickness of the metal layer is 0.02 μm to 0.1 μm.

10. The coating film of claim 1, wherein
the topcoat composition includes 1 wt % to 8 wt % of the hexa-functional or higher urethane (meth)acrylate oligomer, 5 wt % to 15 wt % of the bi-functional urethane (meth)acrylate oligomer, 5 wt % to 15 wt % of the penta-functional urethane (meth)acrylate oligomer, and 18 wt % to 28 wt % of the tri-functional or lower (meth)acrylate monomer based on a total amount of the topcoat composition.

11. The coating film of claim 1, wherein
the hexa-functional or higher urethane (meth)acrylate oligomer in the topcoat composition has a weight average molecular weight of 500 g/mol to 5,000 g/mol and a viscosity at 60° C. of 1,000 cP to 5,000 cP.

12. The coating film of claim 1, wherein
the bi-functional urethane (meth)acrylate oligomer in the topcoat composition has a weight average molecular weight of 5,000 g/mol to 20,000 g/mol and a viscosity at 60° C. of 10,000 cP to 20,000 cP.

13. The coating film of claim 1, wherein
the penta-functional urethane (meth)acrylate oligomer in the topcoat composition has a weight average molecular weight of 5,000 g/mol to 10,000 g/mol, and a viscosity at 60° C. of 500 cP to 3,000 cP.

14. The coating film of claim 1, wherein
the tri-functional or lower (meth)acrylate monomer in the topcoat composition includes 1 wt % to 5 wt % of a mono-functional urethane (meth)acrylate monomer and 15 wt % to 25 wt % of a tri-functional (meth) acrylate monomer based on a total amount of the topcoat composition.

15. The coating film of claim 1, wherein
a thickness of the topcoat layer is 10 μm to 25 μm.

16. The coating film of claim 1, wherein
the undercoat composition and topcoat composition are ultraviolet curable paint compositions.

17. The coating film of claim 1, wherein
the metal layer is formed by vacuum deposition.

18. A vehicle comprising the coating film of claim 1.

* * * * *